B. McCOLLUM.
ALTERNATING CURRENT INDUCTION MOTOR.
APPLICATION FILED MAR. 18, 1912.
1,082,603.
Patented Dec. 30, 1913.
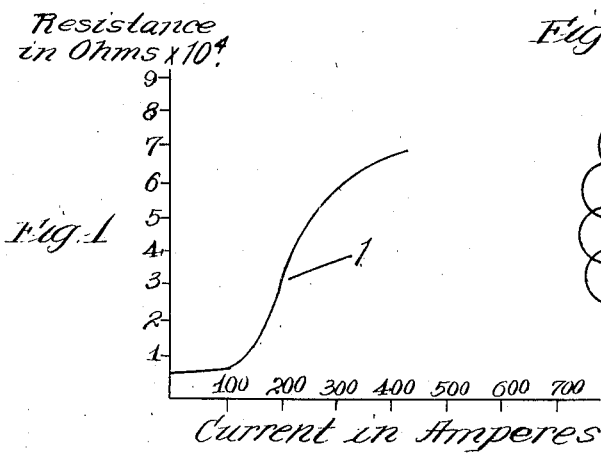
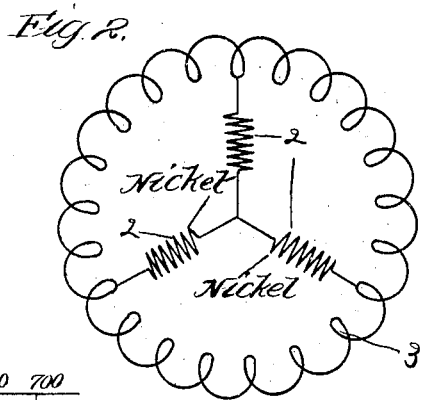
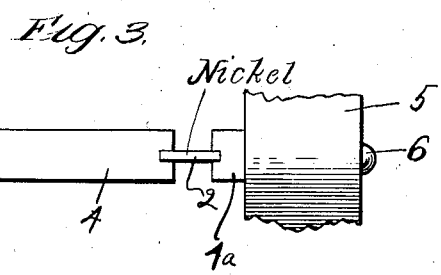
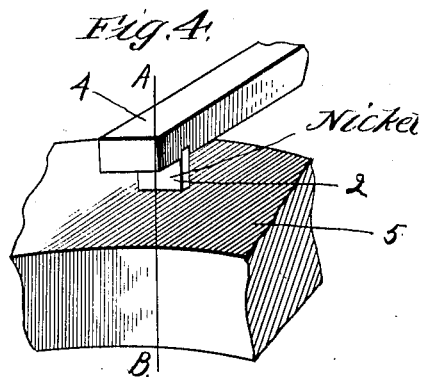
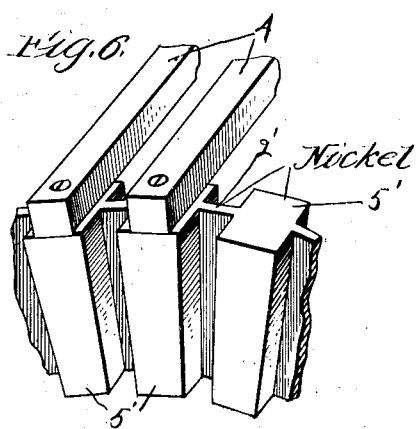
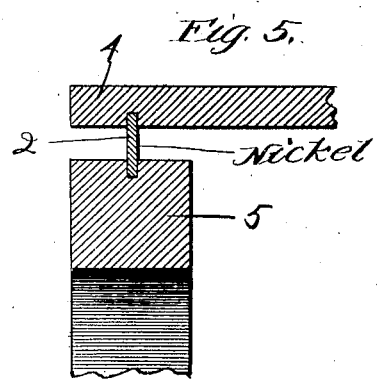
WITNESSES
INVENTOR
Burton McCollum B. McCOLLUM.
ALTERNATING CURRENT INDUCTION MOTOR.
APPLICATION FILED MAR. 18, 1912.
1,082,603.
Patented Dec. 30, 1913.
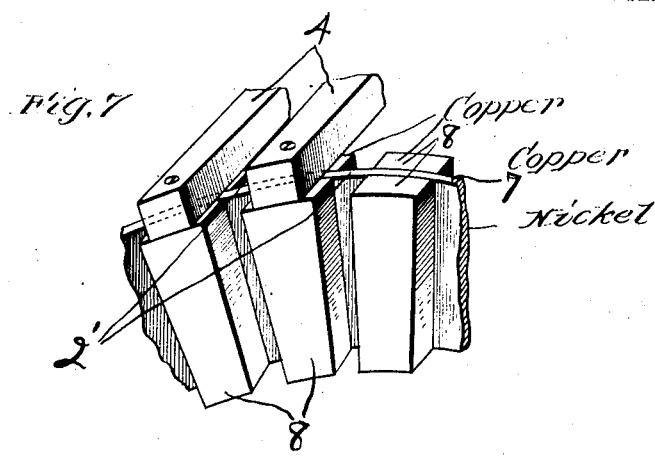
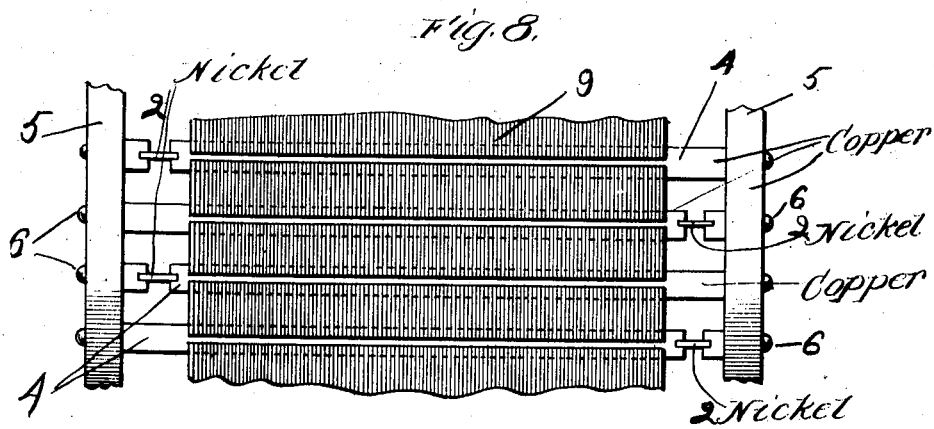
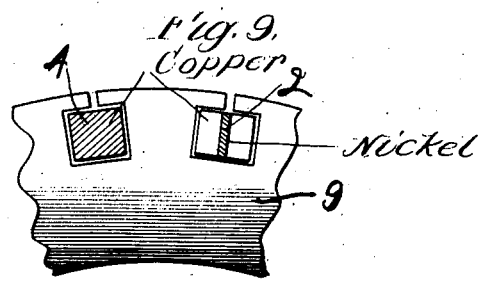
WITNESSES
INVENTOR
Burton McCollum

UNITED STATES PATENT OFFICE.

BURTON McCOLLUM, OF WASHINGTON, DISTRICT OF COLUMBIA.

ALTERNATING-CURRENT INDUCTION-MOTOR.

1,082,603.   Specification of Letters Patent.   Patented Dec. 30, 1913.

Application filed March 18, 1912. Serial No. 684,419.

*To all whom it may concern:*

Be it known that I, BURTON McCOLLUM, a citizen of the United States, and a resident of Washington, District of Columbia, have invented a new and useful Improvement in Alternating-Current Induction-Motors, of which the following is a specification.

In order that induction motors shall have a high starting torque, it is necessary that the resistance of the secondary electric circuits shall be high, while in order that they may have a good efficiency and close speed regulation under ordinary load conditions, it is necessary that this secondary resistance shall be low.

The object of the present invention is to provide a simple and reliable means whereby the resistance of the secondary circuits is made to change automatically from a high value under starting conditions to a relatively low value under normal working conditions. One means whereby I am enabled to accomplish this result is fully described in the following specification.

The present specification consists in part of a continuation of the disclosure of previous applications, Serial Nos. 612,118 and 664,219 filed March 3, 1911, and Dec. 6, 1911 respectively, in which it was shown how by inserting permanently in certain conductors of the secondary circuit resistance elements having a high positive temperature coefficient of resistance, and characterized by an abrupt rise of resistance at a critical value of current, and by further so proportioning the resistance elements that the normal starting current is above the critical current value, and the normal full load current below said critical value, the resistance can be made to vary automatically so as to cause the motor to give a high starting torque and high running efficiency together with an improved power factor. In the above mentioned specifications it was further shown that iron is a suitable material from which to make these resistance elements, and that iron coated with nickel will give even better results. I have also discovered that nickel alone, when used in a nearly pure state, is a good material from which to make these resistance elements, this material possessing the advantage over iron for this purpose that it is much more resistant to oxidation than iron, and hence can be worked at a much higher temperature without deterioration. It can also be used at higher temperatures than resistance elements consisting of iron coated with nickel for the reason that the latter cannot be worked above the temperature at which nickel forms an alloy with iron, whereas with pure nickel the limiting temperature is determined only by the rate of oxidation of the metal.

My invention is fully described below, reference being made to the accompanying drawings.

Of the drawings:—Figure 1 is a curve showing the variation of resistance of a specimen of nickel as a function of the current flowing through it. Fig. 2 is a diagrammatic representation showing how the nickel resistances may be connected to the windings of a phase wound motor. Fig. 3 shows one method of introducing nickel resistances into a squirrel cage rotor. Fig. 4 shows in diagrammatic form another embodiment of my invention. Fig. 5 is a side elevation showing a section through A—B of the structure shown in Fig. 4. Fig. 6 shows still another embodiment of my invention in which the resistance elements are placed in the short circuiting rings. Fig. 7 shows a modification of the construction shown in Fig. 6. Fig. 8 is a side elevation of a portion of the secondary showing an alternate arrangement of the resistance elements in the conductor bars on each end of the rotor. Fig. 9 is an end elevation of a portion of the structure shown in Fig. 8.

Referring particularly to Fig. 1, it will be seen how the resistance of nickel varies with the current passing through it. The ordinates of the curve 1 represent the resistance, and the abscissæ the current. It will be observed that for small values of current the resistance is not materially affected, but as the current is increased to a point where it begins to heat the nickel considerably the resistance rises abruptly, and with a comparatively small further increase in current the resistance rises to a manifold value. This increase in resistance always takes place at a certain well defined critical value of current depending chiefly on the length and cross section of the resistance element. It will be readily understood, therefore, that if we have resistance elements of nickel connected in series with the secondary winding of an induction motor, and further, if the normal full load current of the rotor is somewhat below that required to produce the abrupt rise of resistance, the total resistance of the rotor can be made relatively low, thus giving good efficiency and speed regulation under normal load conditions. At starting however, the current is much larger, and the resistance elements can readily be so designed that the starting current is above that required to produce the abrupt rise of resistance, in which case the starting resistance will be relatively high, thus giving rise to increased starting torque, and at the same time reducing the currents during the starting period. As the motor speeds up however, the current decreases and finally falls to a value below the above mentioned critical value, and the resistance automatically returns substantially to its original low value. It is important also that the amount of metal in the resistors shall be as small as practicable so that their capacity for absorbing heat shall be small in order that they may heat quickly and thus enable the motor to develop high starting torque immediately after the current is switched on. In order to accomplish this and at the same time keep the resistance low enough to give satisfactory efficiency, it is usually necessary to make the resistance elements of very short length and very small cross section as compared to the other conductors, in circuit with which they are connected.

Fig. 2 shows diagrammatically how the nickel resistors 2 may be connected to the secondary windings 3 of a phase wound rotor when a three phase connection on the secondary side is desired. The corresponding method of connection for any number of phases and for either ring or star connection will readily be understood by any one acquainted with polyphase apparatus.

In applying this invention in the case of squirrel cage rotors, it is necessary to use a considerable number of resistors in order that no element of current may flow in a complete circuit without passing through at least one of the resistors. One method is to place a resistor in each bar near its end, as shown in Fig. 3. Here a resistance element 2 of nickel having very short length and very small cross section compared to the bar 4 is inserted in the bar, preferably close to its junction with the short circuiting ring 5. In the case illustrated, the nickel resistor is connected to the copper bar 4 and to the lug 4ª by soldering, and the lug 4ª is connected to the ring 5 by means of the screw 6. It is evident however, that any other means of making these connections such as riveting, clamping, welding, or other well known means will suffice equally well.

Another embodiment of my invention is shown diagrammatically in Fig. 4, in which the short circuiting ring 5 is made smaller than the distance between conductor bars on opposite sides of the rotor, and the nickel resistors 2 extend from the bars 4 radially inward to the ring 5 substantially as shown. Fig. 5 shows a section through the line A—B of the structure shown in Fig. 4. In the construction shown, the nickel resistance 2 is soldered to the ring 5 and the bar 4, but any other means designed to give a good and permanent electrical and mechanical connection will suffice.

In Fig. 6, the nickel resistance elements are inserted in the short circuiting ring 5' by using rings of nickel and providing portions of reduced cross section 2' between adjacent points of connection between ring and bars. A modified form of this structure is shown in Fig. 7 in which a continuous ring of nickel in the form of a thin edgewise band 7 is used, and on the sides of this are fastened in good electrical contact, as by soldering for example, blocks 8 of copper or other good conducting material. This has the advantage over the structure shown in Fig. 6 in that the resistance of the enlarged portions of the ring is greatly reduced, thus confining practically all of the resistance of the short circuiting ring to the small portion 2', which can be made as short as desired so that the total resistance can be kept low even while the cross section is made very small, thus making the reduced portions adapted to be heated rapidly, and also to give a large ratio of increase in resistance.

In Fig. 8 is shown in side elevation a portion of the rotor including a portion of the iron core 9, showing more in detail a practical embodiment of the structure shown in Fig. 3. Here it will be seen that the nickel resistors 2 are placed in alternate bars on each end of the rotor. In this arrangement, the end rings 5 are each connected directly to half of the conductor bars without the interposition of the resistors, so that these latter are not subjected to as great mechanical strain as would occur if all the resistors were placed on one end of the rotor. In most cases it will be desirable also to further support the short circuiting rings 5 by fixing them rigidly to the rotor core or spider, in which case the resistors could be grouped in any desired manner on either end of the rotor.

The structure shown in Fig. 9 is an end elevation of a portion of that shown in Fig. 8. Here the end ring 5 is removed, showing in section one end of a copper conductor 4 and a section through one of the nickel resistors 2.

While nickel can be used alone as described above and its resistance made to rise to a manifold value during the starting period without causing any appreciable deterioration of the nickel resistors, it may often be desirable to work the resistors at a still higher temperature at starting in order to get a greater rise of resistance and a correspondingly low starting current. In such cases, it is necessary to protect the nickel from oxidation, as by completely inclosing it so as to shield it from the air. One method of doing this, which I have found satisfactory, is to coat the nickel with a metal more resistant to oxidation at high temperatures. Nickel coated with platinum is well suited in such cases, and since the resistors can be made very small, and since only a very thin coating is required, the cost of such coating is not a serious matter.

The number of resistors required is, in general, equal to the number of phases in the rotor circuit. In a plain squirrel cage rotor, therefore, there will be required as many resistors as there are bars in the squirrel cage. Special variations of the squirrel cage type may be used however to reduce the number of resistors. One method is to use a plurality of rings on one or both ends of the rotor and connect each of the rings to bars spaced about one pole pitch apart, in which case each pair of bars constitutes one phase of the multiphase rotor, so that only one half of the bars need be provided with resistors.

Various other means of inserting the nickel resistors will be readily seen by any skilled mechanic, and in the annexed claims I aim to cover broadly all cases where resistance elements of nickel are used in the secondary circuits of induction motors for the purpose hereinabove set forth.

I claim:

1. In an induction motor, a secondary electrical circuit containing resistances of nickel, said resistances being of short length and small cross section as compared to the conductors forming the rest of the electrical circuit.

2. In an induction motor, a secondary electrical circuit containing resistances of nickel, said resistances being so disposed that no element of current can flow through a complete circuit in said secondary circuit without passing through at least one of said resistors.

3. In an induction motor, a secondary electrical circuit containing resistances of nickel having such a degree of purity as to be characterized by an abrupt rise of resistance at a critical value of current.

4. In an induction motor, a secondary electrical circuit containing resistances of nickel characterized by an abrupt rise of resistance at a critical value of current, said resistances being so proportioned that the normal starting currents in the resistances are above said critical value, and the normal full load currents below said critical value.

5. In an induction motor, a secondary electrical circuit containing nickel resistances, said resistances being of such short length and reduced cross section as to heat rapidly and give rise to a manifold increase in resistance within a few seconds after the current is switched on.

6. In an induction motor, a secondary electrical circuit containing nickel resistances, the number of said resistances being equal to the number of phases in the secondary electrical circuit.

7. In an induction motor, a secondary electrical circuit of the squirrel cage type, said electrical circuit containing resistances of nickel, the number of said resistances being equal to the number of bars of the squirrel cage.

8. In an induction motor, a secondary electrical circuit containing resistances of nickel, said resistances being coated by a substance which is not chemically changed when heated in air to the temperature reached by the resistances when carrying the normal starting currents in the secondary circuits of the motor.

BURTON McCOLLUM.

Witnesses:
MINNIE LESTER,
J. C. McCOLLUM.